(12) United States Patent
Schrimmer et al.

(10) Patent No.: US 7,438,428 B2
(45) Date of Patent: Oct. 21, 2008

(54) NOVELTY GLOW SPIKE

(75) Inventors: Michael L. Schrimmer, Vernon Hills, IL (US); David Boone, Vernon Hills, IL (US)

(73) Assignee: Filtrex Holdings Pte, Ltd., Parklane Mall (SG)

( * ) Notice: Subject to any disclaimer, the term of this patent is extended or adjusted under 35 U.S.C. 154(b) by 92 days.

(21) Appl. No.: 11/670,220

(22) Filed: Feb. 1, 2007

(65) Prior Publication Data

US 2008/0186694 A1    Aug. 7, 2008

(51) Int. Cl.
*F21K 2/00* (2006.01)
*C09K 3/00* (2006.01)

(52) U.S. Cl. ............ 362/34; 362/84; 362/119; 252/700

(58) Field of Classification Search ......... 362/119, 362/120, 84, 34; 206/219; 252/700; 313/483
See application file for complete search history.

(56) References Cited

U.S. PATENT DOCUMENTS

| 3,751,846 | A | * | 8/1973 | Benjamin, Sr. | ........... 446/197 |
| 5,179,938 | A | * | 1/1993 | Lonky | ........... 600/223 |
| 5,683,316 | A | * | 11/1997 | Campbell | ........... 473/570 |

* cited by examiner

*Primary Examiner*—Ali Alavi
(74) *Attorney, Agent, or Firm*—Levenfeld Pearlstein, LLC

(57) ABSTRACT

A chemiluminescent glow spike includes a hand tool having a transparent plastic tube portion as a shell container for a first agent of a liquid chemiluminescent material and for a glass vial containing a second agent of the liquid chemiluminescent material. A distal end of the transparent plastic tube portion is formed with a penetrating spike portion to mount a comestible article by a user. Application of an external force to the transparent plastic tube containing the glass vial breaks the glass vial to cause the first and second agents to intermix to activate the liquid chemiluminescent material to provide a fluorescent/luminescent effect.

10 Claims, 1 Drawing Sheet

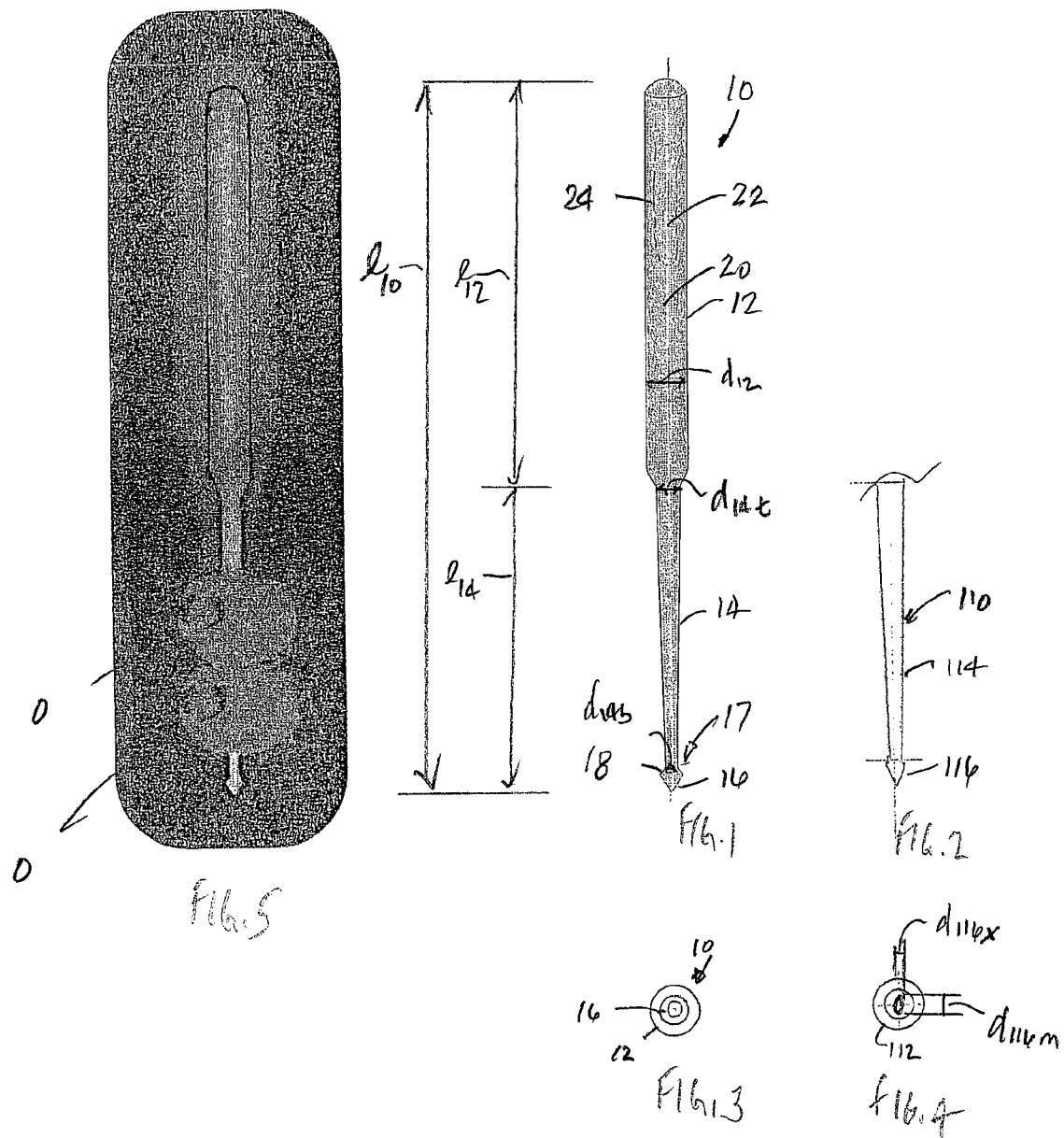

NOVELTY GLOW SPIKE

BACKGROUND OF THE INVENTION

The invention relates to a chemiluminescent apparatus that provides a fluorescent/luminescent effect in a darkened environment and provides a means to engage consumable objects or to mount a comestible article, including garnish and fruit added to a beverage to make the beverage appearance and desirability more attractive to the consumer.

Numerous glow in the dark novelty devices are known. These devices, which are commonly referred to as light sticks, are typically used as necklaces, bracelets, wands and the like. These devices are also known to be used as drink stirrers.

Glow in the dark elements are also known for use as olive spikes. These, however, are limited to battery-powered elongated, spear-like elements. Such devices are relatively expensive due to the electronic circuitry, typically LED lighting devices, and power sources (batteries).

Accordingly, there is a need for an olive spike of entertainment value as well as providing a hand tool of combined entertainment value with utility purpose. Desirably, such a novelty glow spike serves as a fluorescent/luminescent device in a darkened environment such as in a food and/or beverage establishment as a source of illumination, partial though the illumination may be. More desirably such a novelty chemiluminescent spike device is activated by the user as desired.

BRIEF SUMMARY OF THE INVENTION

A chemiluminescent glow spike is formed as a hand tool having a transparent plastic tube portion as a shell container for a first agent of a liquid chemiluminescent material and for a glass vial containing a second agent of the liquid chemiluminescent material. A distal end of the transparent plastic tube portion has a penetrating spike portion to mount a comestible article, such as an olive, by a user of the hand tool.

Application of an external force to the transparent plastic tube containing the glass vial breaks the glass vial to cause the first and second agents to intermix to activate the liquid chemiluminescent material to provide a fluorescent/luminescent effect.

The first agent can be a chromagenic material and the second agent an auxochrome agent. The chromagenic material can be a reductant compound and a solvent. The reductant compound can be selected from the group consisting of 9,10 diphenylanthracene, 9,10-bis (phyenylethynyl)anthracene and 5,6,11,12-tetraphenylnapthacene. The reductant compound can be an oxalic phthalate reductant with a phthalein structure. The auxochrome agent can be hydrogen peroxide.

In one embodiment, an end tip of the first container structure has a spike portion formed with a penetrating tip including a barb to engage a comestible article. The first container structure can be formed having a circular cross-sectional shape. The cross-sectional shape can extend to the penetrating tip. Alternately, the cross-sectional shape extends along the penetrating tip and transitions to an almond-shaped barb.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein:

FIG. 1 is a perspective view of an olive glow spike comprising a glow portion and a spike portion;

FIG. 2 illustrates an alternate embodiment of the spike portion;

FIG. 3 is a bottom view of the glow spike of FIG. 1, showing a circular barb portion;

FIG. 4 is a bottom view of the glow spike of FIG. 2, showing an almond shaped barb portion; and FIG. 5 illustrates the glow spike with olives speared on the penetrating tip portion and showing, figuratively, the chemiluminescence in an activated state.

DETAILED DESCRIPTION OF THE INVENTION

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

Referring now to the figures, and in particular to FIG. 1, there is shown a novelty glow spike 10 embodying the principles of the present invention. The olive spike 10 can be used for spiking or spearing, for example, olives O to garnish martinis and the like. The spike 10 includes chemiluminescent elements within a main body or handle portion 12 of suitable $l_{12}$ length for user hand engagement and a spike portion 14 of suitable length $l_{14}$ to engage an olive O at its end within a wine or cocktail glass. A penetrating tip 16 is formed at the end 17 of the spike portion 14. The penetrating tip 16 preferably includes a barb 20 to, for example, prevent olives O from inadvertently slipping from the spike portion 14.

The present invention as such is a novel article capable of providing a fluorescent/luminescent effect to a drink that is contained in a wine or cocktail glass. The fluorescent/luminescent effect is obtained by the an individual manipulating the handle portion 12 of the spike device 10 to cause an otherwise inactive chemiluminescent agents to intermix. One of the agents 20 is contained within the handle portion 12 of the spike 10 and the other agent 22 is present in a frangible, e.g., glass, vial 24 in the first agent 20. When the glass vial 24 is broken, the agents 20, 22 mix and the result is an olive spike 10 of fluorescent/luminescent entertainment value for the holder of the subject drink as well as utilitarian value as a hand tool to secure and/or retrieve an olive O or other garnishment from the drink.

In one embodiment of the olive spike as seen in FIGS. 1 and 3, the entirety of the olive spike 10, at any point along its length, has a circular cross-section. That is, the handle 12 has a circular cross section as does the spike portion 14, as well as the penetrating tip 16 and barb 18. Alternately, as seen in FIGS. 2 and 4, the barb 118 can be formed having an almond shape with converging ends 126 when seen in bottom view or cross-section.

An exemplary embodiment of the spike 10 has an overall length $l_{10}$ of about 4-½ inches, with a main body portion length $l_{12}$ of about 2-½ inches to 2-¾ inches. The diameter $d_{12}$ of the handle section 12 is about 7 millimeters. The spike portion 14 is tapered and has a diameter $d_{14t}$ of about 4 millimeters at the top of the spike portion 14 (at the spike portion 14/handle 12 juncture), and tapers to a diameter $d_{14b}$ of about 2 millimeters at the bottom of the spike portion 14, at about the juncture with the penetrating tip 16. The penetrating tip 16 has a diameter $d_{16}$ of about 4 millimeters across its widest portion tapering to a diameter of about two millimeters. An alternate embodiment 110 with an almond-shaped tip 116 has a tip major axis diameter $d_{116m}$ of about 4 mm and a tip minor axis diameter $d_{116x}$ of about 2 mm.

Those skilled in the art will recognize the chemical constituents 20, 22 typically used in chemiluminescent devices. For example, the chemiluminescent constituent structures and formulations can be any of a number of commercially available configurations and formulations. A preferred configuration of the spike 10 has an outside chamber 14 and a breakable inside chamber or vial 24 within the outside chamber 12. The outside or first chamber 12 contains the first chemical agent and the second internal vial 24 contains the second agent. The vial 24 is breakable by a user so that the agents or solutions 20, 24 mix and react with one another to chemically drive the chemiluminescent light emission to produce a fluorescent/luminescent effect.

In use of the present spike 10, an external force is applied to the handle 12 which in turn stresses the vial 24. The vial 24 breaks and allows the contents (the second agent 22) to mix with the first agent 20 to activate the chemiluminescent constituents to produce a fluorescent/luminescent effect.

In one formulation or combination of solutions, the first agent 20, is a chromogen, and contains a reductant compound and a fluorescent dye compound and the second agent, the auxochrome, contains an oxidant compound and a solvent. One known oxidant auxochrome is hydrogen peroxide, which can be used with a chromogenic dye compound such as an oxalic phthalate reductant with phthalein structure and water solvent. Exemplary chromagenic fluorescent dye compounds are 9,10-diphenylanthracene, 9,10-bis(phenylethynyl)anthracene, and 5,6,11,12-tetraphenylnaphthacene.

The chromogen is caused to operate as an enhanced fluorescent dye material by presence of an auxochrome system to absorb and embellish the fluorescent effect upon the introduction of an auxochrome color fixing group. The auxochrome fixing group can, for example, be selected from an amino group (—NH$_2$), a hydroxyl group (—OH) or a carboxyl group (—COOH). Brilliant fluorescent effects are known to be provided by organic compounds with phthalein structures that have the xanthene nucleus. Chromogens typically are intensely colored organic dyes in alkaline solutions with aromatic structures as anthracenic and napthalenic groups. Other combinations of chemicals and methods/materials for providing the chemiluminescent effect will be recognized by those skilled in the art and are within the scope and spirit of the present invention.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover all such modifications as fall within the scope of the disclosed, exemplary embodiment.

What is claimed is:

1. A chemiluminescent glow spike comprising:
a hand tool consisting of a transparent plastic tube portion as a shell container for a first agent of a liquid chemiluminescent material and for a glass vial containing a second agent of the liquid chemiluminescent material, wherein a distal end of the transparent plastic tube portion comprises a penetrating spike portion of the hand tool to mount a comestible article by a user of the hand tool,
wherein application of an external force to the transparent plastic tube containing the glass vial breaks the glass vial to cause the first and second agents to intermix to activate the liquid chemiluminescent material to provide a fluorescent/luminescent effect.

2. The chemiluminescent glow spike in accordance with claim 1 wherein the first agent is a chromagenic material and the second agent is an auxochrome agent.

3. The chemiluminescent glow spike in accordance with claim 2 wherein the chromagenic material is a reductant compound and a solvent.

4. The chemiluminescent glow spike in accordance with claim 3 wherein the reductant compound is selected from the group consisting of 9,10 diphenylanthracene, 9,10-bis (phyenylethynyl)anthracene and 5,6,11,12-tetraphenyl-napthacene.

5. The chemiluminescent glow spike in accordance with claim 3 wherein the reductant compound is an oxalic phthalate reductant with a phthalein structure.

6. The chemiluminescent glow spike in accordance with claim 2 wherein the auxochrome agent is hydrogen peroxide.

7. The chemiluminescent glow spike in accordance with claim 1 wherein an end tip of the first container structure comprises a spike portion comprising a penetrating tip including a barb to engage a comestible article.

8. The chemiluminescent glow spike in accordance with claim 7 wherein the first container structure has a circular cross-sectional shape.

9. The chemiluminescent glow spike in accordance with claim 8 wherein the cross-sectional shape extends to the penetrating tip.

10. The chemiluminescent glow spike in accordance with claim 8 wherein the cross-sectional shape extends along the penetrating tip and transitions to an almond-shaped barb.

* * * * *

UNITED STATES PATENT AND TRADEMARK OFFICE
CERTIFICATE OF CORRECTION

| | | |
|---|---|---|
| PATENT NO. | : 7,438,428 B2 | Page 1 of 1 |
| APPLICATION NO. | : 11/670220 | |
| DATED | : October 21, 2008 | |
| INVENTOR(S) | : Schrimmer et al. | |

It is certified that error appears in the above-identified patent and that said Letters Patent is hereby corrected as shown below:

Title page, item (73), Assignee, should read:

(73) Assignee: Chemical Light Inc., Vernon Hills, IL (US)

Signed and Sealed this

Twenty-eighth Day of December, 2010

David J. Kappos
*Director of the United States Patent and Trademark Office*